United States Patent
Weber

(10) Patent No.: US 8,234,192 B2
(45) Date of Patent: Jul. 31, 2012

(54) FULLY AUTOMATED, COMPUTER-AIDED INTERVENTION APPARATUS WITH OPERATIONAL STABILIZATION APPARATUS FOR MALFUNCTIONS, AND APPROPRIATE METHOD

(75) Inventor: Matt Weber, Ridgefield, CT (US)

(73) Assignee: Swiss Reinsurance Company Ltd., Zurich (CH)

( * ) Notice: Subject to any disclaimer, the term of this patent is extended or adjusted under 35 U.S.C. 154(b) by 1063 days.

(21) Appl. No.: 12/141,563

(22) Filed: Jun. 18, 2008

(65) Prior Publication Data

US 2009/0171480 A1 Jul. 2, 2009

Related U.S. Application Data

(60) Provisional application No. 60/944,634, filed on Jun. 18, 2007.

(51) Int. Cl.
*G06Q 40/00* (2006.01)

(52) U.S. Cl. .............................. 705/35; 700/32; 700/33
(58) Field of Classification Search .................... 705/35, 705/36 R; 700/32
See application file for complete search history.

(56) References Cited

U.S. PATENT DOCUMENTS

2009/0204235 A1* 8/2009 Dubinsky ..................... 700/32

* cited by examiner

*Primary Examiner* — James Vezeris
(74) *Attorney, Agent, or Firm* — Oblon, Spivak, McClelland, Maier & Neustadt, L.L.P.

(57) ABSTRACT

The invention proposes a fully automated, computer-aided intervention apparatus (80) with an operational stabilization apparatus (10) and an appropriate method for operational apparatuses (41), where appropriate intervention means (40) are activated by means of an activation apparatus (203) if an intervention event detected by means of at least one pickup apparatus (401) is picked up. The intervention means (40) may comprise, in particular, automated alarm, monitoring and/or control apparatuses.

36 Claims, 7 Drawing Sheets

FULLY AUTOMATED, COMPUTER-AIDED INTERVENTION APPARATUS WITH OPERATIONAL STABILIZATION APPARATUS FOR MALFUNCTIONS, AND APPROPRIATE METHOD

The invention relates to a fully automated, computer-aided intervention apparatus with an operational stabilization apparatus for malfunctions and/or stoppages, where the intervention apparatus comprises a protected memory unit with an incrementable stack for periodically picking up an incrementation parameter which can be attributed to one or more operational apparatuses, and also an activation apparatus for the automated activation of appropriate intervention means on the basis of the incremented stack if an intervention event detected by means of at least one pickup apparatus occurs. In particular, the invention relates to intervention apparatuses in connection with automated alarm, monitoring or control systems.

The worldwide networking and globalization of the markets, the change of climate with the abundant occurrence of catastrophes with a cross-regional effect (tsunamis, hurricanes, typhoons, earthquakes, etc.) and the occurrence of a new dimension of terror and war (e.g. attack on the World Trade Center, Iraq war, bath crisis, hurricanes on the west coast of America (New Orleans), tsunami in Asia), have resulted in the need for new alarm, monitoring and/or intervention systems or apparatuses which are able to effectively intercept such events and their effects. On the one hand, malfunctions need to be prevented or, if they occur, need to be able to detected and corrected, and on the other hand such systems are also meant to be used to prevent these from resulting in destabilization of the economy and/or stock market or even the world markets. In this context, such intervention apparatuses may be concerned not only with the type of intervention means (e.g. catastrophe resources, malfunction means etc.) but also with the manner in which the monitoring parameters measured by the pickup apparatuses and detection apparatuses are processed and converted technically for the purpose of controlling activation units for the intervention means or alarm means. However, it is precisely the technical implementation which presents problems which are very difficult to overcome today. One of the fundamental technical problems is particularly the stability of the systems, whether automated or nonautomated. In addition, the vast volume of data which is available today at any time from a wide variety of pickup apparatuses and detection apparatuses (e.g. wind speed sensors, satellite pictures, water level sensors, water and wind temperature sensors etc. etc.) makes monitoring through pure human action and perception virtually impossible. The technical implementation of such apparatuses should therefore, if possible, interact both with the pickup apparatuses and with the intervention means in fully automated fashion and in real time.

However, as far as their technical requirements and hence also their technical implementation are concerned, automated intervention systems in these areas differ very greatly, since their constraints differ greatly from application area to application area. Thus, large-scale catastrophes, catastrophe damage or industrial accidents (such as the Chernobyl reactor fire) obey totally different laws than malfunctions in the automotive industry or building sector, for example. These laws and corresponding methods are known abundantly in the insurance industry or in the case of damage-cover and risk monitoring systems in the prior art, for example. However, their technical implementation, in order to be able to use them in fully automated systems, eludes the known prior art almost completely even in this area. Particularly when coping with malfunctions as a result of larger-scale catastrophes such as natural catastrophes, war or terror, coupled or uncoupled intervention systems are known in different variations in the prior art. Thus, by way of example, decentralized monitoring sensors and monitoring units which are connected to a central monitoring apparatus are known which are used for early warning identification and alerting. It is likewise known practice to transmit location-dependent electrical signals from these monitoring apparatuses periodically or upon request for the purpose of automated alarm triggering.

Automated intervention monitoring apparatuses and appropriate methods, particularly cash-sum-value-based intervention monitoring apparatuses, such as are required for automated insurance systems or damage cover systems, can make up part of the technical implementation of such intervention apparatuses. The operational apparatuses attributed to the intervention apparatus can ensure that the intervention apparatus works, for example by means of periodic transfer or transfers of attributable, protected units (particularly cash-sum-value-based parameters) upon request. In principle, the transfer could also occur once. For certain systems, reference is also made in this case to the operational apparatuses and/or operators being insured. Cash-value-based transfers can also be referred to as remuneration for the transfer (e.g. "cession") of responsibility, e.g. in the form of a premium, in such systems regardless of the technical implementation of the apparatus. The "policies" are frequently ascertained using complex mathematical insurance methods. This ascertainment is not done automatically in the prior art and is usually dependent on a personal assessment by an appropriate expert. The mathematical insurance methods often attempt to use appropriate rating apparatuses to approximate the risk classification which is introduced by different users of an intervention apparatus, such as policy holders, so that the premiums are estimated manually or by a person on the basis of perceived risk classifications and/or ratings and thus sufficiently high collateralization levels for a risk to an apparatus can be guaranteed in the event of damage. The collateralization level (cash-value-based or non-cash-value-based) may be an operating or intervention requirement for the intervention apparatus in order to guarantee that the intervention apparatus remains operable for all possible malfunctions. Hence, by way of example, it is also possible for all arising claims to be covered by means of the apparatus in the case of intervention. It goes without saying that with partially or fully cash-value-based intervention apparatuses the apparatus may have the option of retaining a determinable cash value sum as profit, for example. The underlying method for such additions is known in different forms in the prior art, with the relevant technical implementations being able to differ greatly. As a further addition for cash-value-based intervention apparatuses, the prior art also has known methods, such as dynamic systems and/or systems implemented on a user-specific basis. In the case of cash-value-based apparatuses, these may include elements, for example, such as the fact that the policy holders, who in the past have had to assert losses using appropriate claims for an apparatus and/or living being, for example the businesses with extraordinary risk or malfunctions as a result of unprofessional maintenance, are attributed to a higher risk classification with correspondingly higher remuneration parameters, such as premiums, on a user-specific footing on the basis of these constraints. For automation, user-specific parameters, in particular, can be assessed by the system at the same time. By way of example, it may be assumed that businesses in urban areas are exposed to higher risk for impacts on the environment as a result of malfunctions than businesses in a rural area. Such data based on the past may be useful for rating, i.e. for stipulating the collateralization levels and appropriate remunerations or the risk to be expected. Nevertheless, it is naturally the case that such data do not always have to include accurately arising future risks for each user or policy holder. In principle, the technical implementation of the present invention does not relate exclusively or just in part to cash-value-based elements but rather relates quite generally to automated alarm apparatuses, monitoring and/or control apparatuses for fully automated intervention systems, however.

In the prior art, the known intervention apparatuses usually have far too long a reaction time to be able to react meaningfully to catastrophes of larger proportions. In addition, the ever further reaching consequences result in instabilities which are almost impossible to handle with the usual systems. The effect of this is that mechanization can be ruled out to date. However, even unautomated systems are affected by these instabilities and have already led to collapses in the affected intervention systems more than once. Semi-automated intervention apparatuses with cash-value-based modules having an, if possible, uncorrelated partial risk protection module with an interface to loan markets, what are known as insurance linked securities (ILS), have been known since the mid-1990s and today exhibit capitalization of between 8 and 10 billion US dollars, which documents the great success of these systems. In this case too, the technical implementations of "insurance linked securities"-based modules in the prior art differ greatly from one another. The main representatives of the ILS systems are based on what are known as catastrophe bonds or cat bonds, which alone cover a sum of over 6 billion US dollars (figures from 2003). Although these systems were often ridiculed at the beginning, the growing acceptance among large investors worldwide shows their true significance. For insurance systems, reinsurance systems and an ever increasing number of industrial apparatuses, cat bonds can effectively be used to produce perennial protection against natural catastrophes etc. without the usual credit risk. Cat bond systems provide investors with attractive returns and the option of reducing a portfolio risk, since cat bonds in name have no correlation in their behavior to all other securities or financial market instruments. Cat bonds are securities or investments having the same function, whose performance rests upon the index of risks on the basis of natural catastrophes. Industrial apparatuses and systems from international firms to local insurance companies have used cat bonds to shore up or reduce their risks. From the investor's point of view, cat bonds work as full, perennial and/or multistage intervention systems, such as reinsurance systems. The pure idea of cat bonds is therefore known in the prior art and as such is of a non-technical nature. The technical implementation of the automation of intervention systems with additional modules for operational protection through interfaces to cat bond systems exhibits considerable difficulties, however, and is not possible in stable fashion in the prior art without additional human intervention.

As mentioned, however, such systems are known in the prior art at least in part and are implemented in different ways. In conventional reinsurance systems, for example, systems in the area of catastrophe risks work in a totally different way than, by way of example, corresponding multistage systems for intervention systems with a high level of statistics, such as in the vehicle industry. In the event of malfunctions in cases of catastrophe, multistage apparatuses usually work such that a first stage is used comprehensively or at least almost comprehensively for operational protection for damage in times without extraordinary malfunction. The second stage intervenes without limitation just from a predefined first threshold value for malfunctions or up to a second predefined threshold value.

It is an object of this invention to propose a fully automated intervention apparatus for operational apparatuses which do not have the aforementioned drawbacks. In particular, it is meant to be a solution which allows automated intervention apparatuses to be designed such that the operability of the apparatus is assured even with an abnormally high occurrence of malfunctions, as in the case of catastrophes, without the apparatus being destabilized such that it collapses. In addition, the effects of dangerous correlations between the operation of the intervention apparatus and the occurrence of the intervention events are meant to be averted or minimized.

In line with the present invention, this aim is achieved particularly by the elements of the independent claims. Further advantageous embodiments are also revealed by the dependent claims and the description.

In particular, these aims are achieved by the invention by virtue of the fully automated, computer-aided intervention apparatus for malfunctions and/or operational stoppages in operational apparatuses comprising an intervention unit with a first protected memory module and a first incrementable stack and also means for periodically picking up incrementation parameters, the incrementation parameter being able to be attributed to one or more operational apparatuses, and also an activation apparatus for activating appropriate intervention means on the basis of the first incremented stack if an intervention event detected by means of at least one pickup apparatus occurs, by virtue of the intervention apparatus comprising an operation stabilizing apparatus with a second protected memory module, a second incrementable stack and a lookup table, where the second stack can be incremented by means of second incrementation parameters and where the second incrementation parameters can be attributed to identification data from network units by means of the lookup table, by virtue of the operational stabilization apparatus comprising a filter module, where measurement data relating to maintenance parameters for the intervention apparatus can be filtered by means of the filter module using a pickup apparatus and can be stored such that they can be attributed to the respective intervention apparatus, with a variable trigger stack being able to be increased in weighted fashion by means of a weighting module on the basis of weighting parameters attributed to the intervention apparatus and on the basis of the aforementioned measurement data, and by virtue of the operational stabilization apparatus comprising a trigger module, where the intervention apparatus can be activated upon detection of a predefinable stack height for the trigger stack on the basis of the second stack, and incrementation parameters can be transferred to the user apparatuses when a predefined timing threshold value is reached by means of the lookup table on the basis of the current stack height of the second stack. By way of example, the counter module may comprise an integrated oscillator, by means of which oscillator it is possible to produce an electrical clock signal at a reference frequency, with the counter being able to be increased periodically on the basis of the clock signal. For the purpose of activating the intervention means, for example, the activation apparatus may comprise a control module by means of which the activation apparatus can be enabled only if pickup of the incrementation parameters is detected periodically. The intervention means may comprise automated emergency apparatuses and/or alarm and control modules (for automated locking or deletion signals, for example) and/or cash-value-based transfer modules, for example. The measurement parameters may comprise the number of interventions by means of the alarm and/or monitoring and/or intervention systems, for example. The variable trigger stack may correspond to an averaged US CatXL level parameter, for example. The averaged US CatXL level parameter may comprise an averaged Composite Domestic US CatXL Price Level, for example. The invention has, inter alia, the advantage that the automated intervention apparatus makes uncorrelated operational protection possible even for systems with large malfunction fluctuations which cannot be predicted or can be predicted only with difficulty, such as in the case of catastrophic events. In particular, fully automated intervention apparatuses, e.g. based on quote sharing, also become possible. This has not been possible to date with any system from the prior art or has been implemented only approximately. Instabilities can be effectively intercepted automatically by this technical implementation. Since the probability of malfunctions from exposure in the case of catastrophic events is picked up with a relatively high level of inaccuracy, it is additionally possible to optimize marginal parameters too, such as cash-value-based operational protection parameters or collateralization level parameters, using the inventive intervention apparatus by virtue of not only the risks for operational intervention being supported in uncorrelated fashion by means of the automated intervention apparatus but also further capital gains being possible by means of the liberated means. This is not possible with any system from the prior art. In addition, this has the advantage, inter alia, that it is also possible for automated multistage intervention apparatuses to be picked up and supported using the inventive system. However, a technical implementation based on quote sharing involves parallel stages, in contrast to hierarchically multistage systems from the prior art, such as in the case of intervention apparatuses for malfunctions caused by catastrophes, such as floods, hurricanes, earthquakes and/or terrorist attacks. Such support for such systems has not been possible in this way in the prior art to date.

In one variant embodiment, the intervention apparatus comprises a first reading module for generating a first stack height signal in line with the current stack height of the first incremented stack, with the first stack height signal being able to be taken as a basis for additionally incrementing the first incrementable stack by means of a first adder module. Similarly, the intervention apparatus may comprise, by way of example, a second reading module for generating a second stack height signal in line with the current stack height of the second incremented stack, with the second stack height signal being able to be taken as a basis for additionally incrementing the second incrementable stack by means of a second adder module. This variant embodiment has, inter alia, the advantage that the periodically picked up incrementation parameter can be optimized without the possibility of influencing the dependability of the inventive apparatus.

In another variant embodiment, the first reading module comprises means for realtime generation of the first stack height signal. By way of example, the intervention apparatus may also comprise a timer unit, with the first stack height signal being able to be produced periodically within a definable time window. Like the first, the second reading module may comprise means for realtime generation of the first stack height signal. The intervention apparatus may also comprise a timer unit, for example, with the second stack height signal being able to be produced periodically within a definable time window. This variant embodiment has, inter alia, the advantage that the incrementation parameters can be dynamically adjusted in real time without the possibility of influencing the dependability of the inventive apparatus.

In a further variant embodiment, the intervention apparatus may comprise a network interface, with the network interface being able to be used to access at least one decentralized database with associated stock-market or financial-institute parameters. This variant embodiment has, inter alia, the advantage that in the case of an at least partly cash-value-based implementation the intervention apparatus can implement the operational protection fully automatically. Similarly, the intervention apparatus may in this case be used to pick up fluctuations by financial parameters fully automatically and to allow for them in the operational protection.

In yet another variant embodiment, the second protected memory unit comprises a memory area which is separate from the incrementable stack, the lookup table being able to be used to associate protected parts of the incrementable stack with the separate stack. This variant embodiment has, inter alia, the advantage that the value parameters are associated with the respective identification data by means of the lookup table not exclusively on the basis of the first and second stacks, but rather the user is guaranteed a minimum association by the intervention apparatus.

In one variant embodiment, the automated intervention apparatus is unidirectionally or bidirectionally connected to the one or more operational apparatuses by means of a monitoring and/or alarm apparatus for the purpose of automated emergency intervention in the event of malfunctions in the one or more transport means. By way of example, the pickup apparatus may comprise a position-finding module which can be used to generate location coordinate parameters for the location of the operational apparatus and to transmit them to the monitoring and/or alarm apparatus of the one or more operational apparatuses and to the intervention apparatus by means of the monitoring and/or alarm apparatus. On the one hand, this variant embodiment has, inter alia, the advantage that, by way of example, the incrementation parameters can be adapted in real time and/or periodically by means of the intervention apparatus. On the other hand, this variant embodiment also has the advantage that operating interventions and/or alarm signals and/or control/monitoring signals can be adapted to suit the relevant intervention event or operational apparatus and/or can be initiated by the automated intervention apparatus in purposeful and likewise optimized fashion.

In another variant embodiment, the intervention apparatus comprises, in addition to the second protected memory unit with the second incrementable stack, at least one submodule which is associated with different intervention classes and/or risk classes, where, upon reaching different determinable threshold values for counters, the lookup table can be used to associate value parameters with the respective identification data on the basis of the first and second stacks, and said value parameters can be transferred by means of the intervention apparatus to at least one network unit via an interface module. The submodules may be associated such that, by way of example, they can be altered by the second memory unit, in particular can be altered dynamically as an embodiment based on a user profile. This variant embodiment has, inter alia, the advantage that graded transmission of the value parameters, e.g. for crediting cash sum values, can be associated on the basis of the second memory unit and can be transmitted to a clearing module, for example, if the second memory unit comprises value parameters after the time interval has elapsed.

At this juncture, it will be stated that the present invention relates not only to the inventive method but also to a system for carrying out this method and to an appropriate computer program product.

Variant embodiments of the present invention are described below with the aid of examples. The examples of the embodiments are illustrated by the following appended figures:

FIG. 1 shows a block diagram which schematically shows the prior art, with the operational apparatuses 41 being divided by the intervention apparatus 20, for example on the basis of geographical position or other criteria, and being used to stabilize the system for the purpose of risk management.

FIG. 2 shows a block diagram which schematically shows an exemplary embodiment of an inventive fully automated, computer-aided intervention apparatus 80 for operational apparatuses 41, with an activation apparatus 203 being used to activate appropriate intervention means 40 if an intervention event detected by means of at least one pickup apparatus 401 is picked up.

FIGS. 3 and 5 show what is known as the Paragon Index, which is a measure of the average price level for catastrophe bonds CatXL on the US market. The Paragon Index is based on over 300 different industrial firms and over 1000 CatCL Layers (45% of total US industry). The Paragon Index is issued every 6 months by Paragon (E.W. Blanch).

Figure 1:
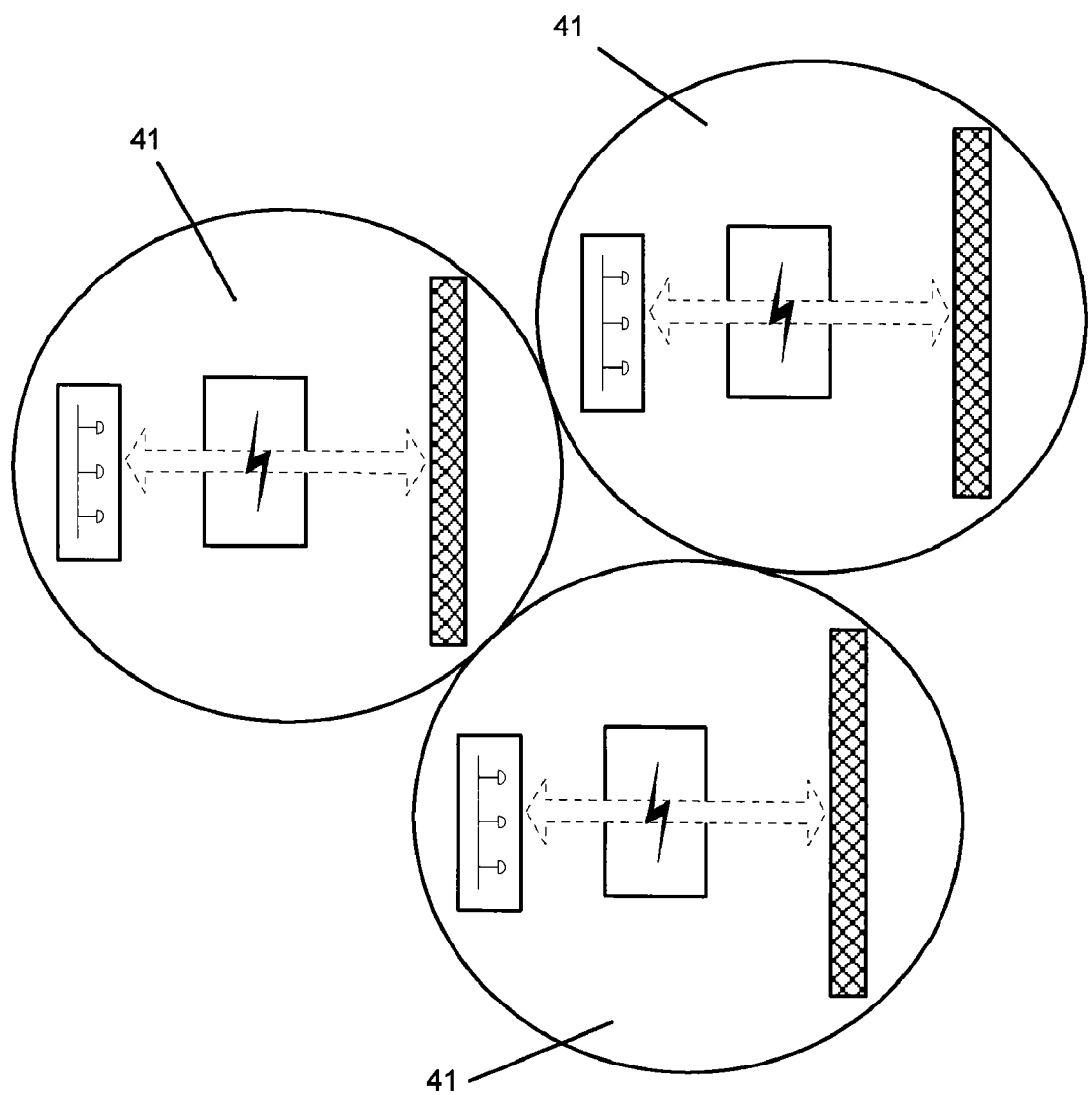
Figure 2:
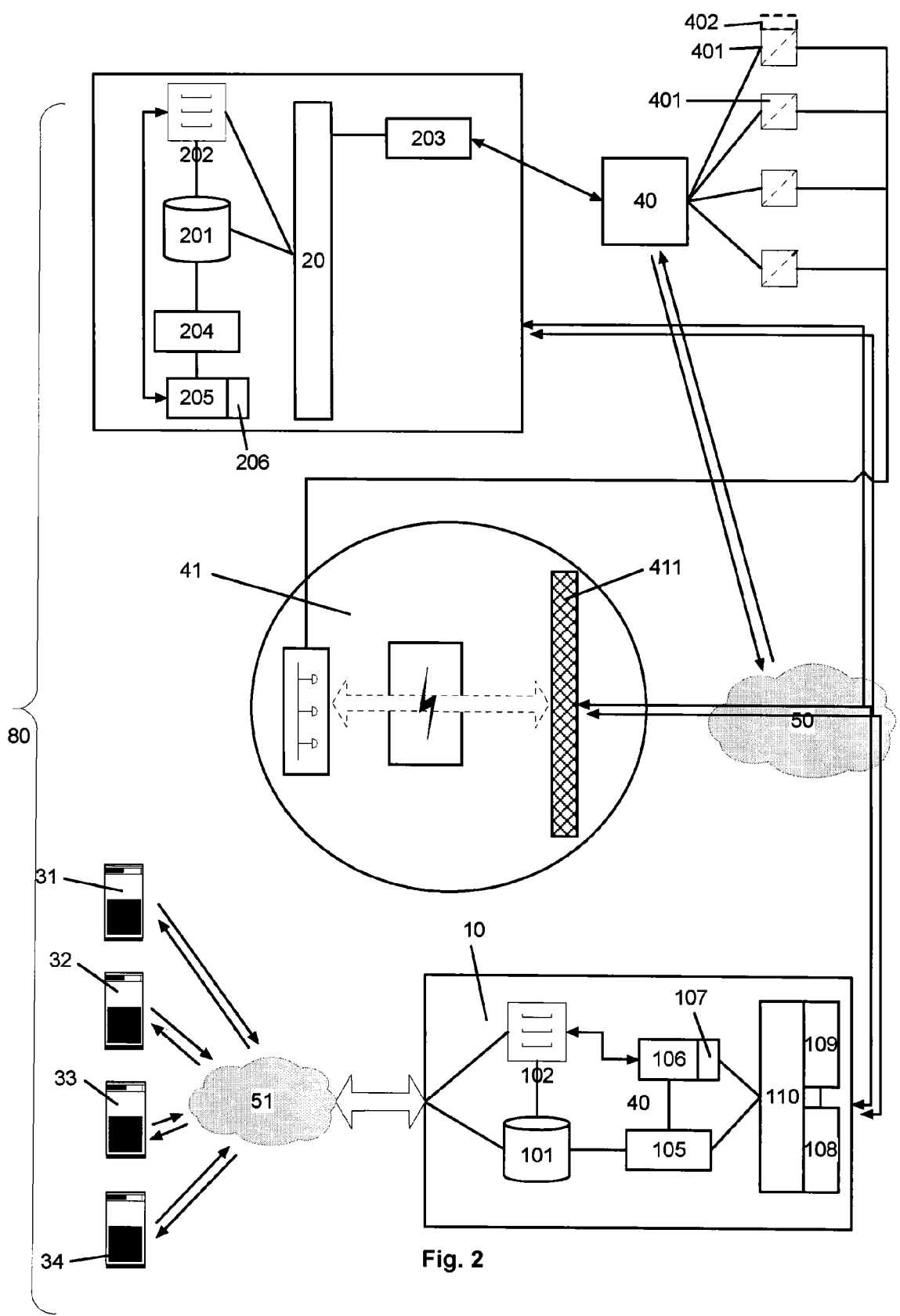

FIG. 1 illustrates an architecture which can be used to implement the invention. In this exemplary embodiment, the intervention apparatus 80 uses a first intervention unit 20 with a first protected memory module 201 and a first incrementable stack 202 to pick up incrementation parameters periodically and/or upon request. The incrementation parameters are attributed one or more operational apparatuses 41. An activation apparatus 203 is used to activate appropriate intervention means 40 on the basis of the first incremented stack 202 if an intervention event detected by means of at least one pickup apparatus 401 is picked up. The intervention apparatus 80 can use a first reading module 204, for example, to generate a first stack height signal in line with the current stack height of the first incremented stack 202, with the first stack height signal being taken as a basis for additionally incrementing the first incrementable stack 202 by means of a first adder module 205. It may be advantageous for the first reading module 205 to be used to generate the first stack height signal in real time. Delayed variants are also conceivable, however. The first stack height signal can be produced by means of a timer unit 206, for example, within a definable time window periodically and/or upon request.

The intervention apparatus 80 comprises an operational stabilization apparatus 10 with a second protected memory module 201, a second incrementable stack 202 and a lookup table 103. The intervention apparatus 80 increments a second incrementable stack 102 on the basis of second incrementation parameters by means of the operational stabilization apparatus 10 with a second protected memory module 101. The second incrementation parameters are attributed to identification data from network units 31, . . . , 34 by means of a lookup table 103. The intervention apparatus 80 can use a second reading module 105, for example, to generate a second stack height signal in line with the current stack height of the second incrementable stack 102, with the second stack height signal being taken as a basis for additionally incrementing the second incrementable stack 102 by means of a second adder module 106. The second reading module 105 can be used to generate the second stack height signal, for example, likewise in real time. Delayed variant embodiments are also conceivable, however. By way of example, a timer unit 107 can be used to produce the second stack height signal within a definable time window periodically. A network interface 301 can be used by the intervention apparatus 80 to access at least one decentralized database with attributed stock-market or financial-institute parameters, for example. By way of example, incrementation parameters can therefore be based particularly on the transferred stock-market or financial-institute parameters.

Figure 3:
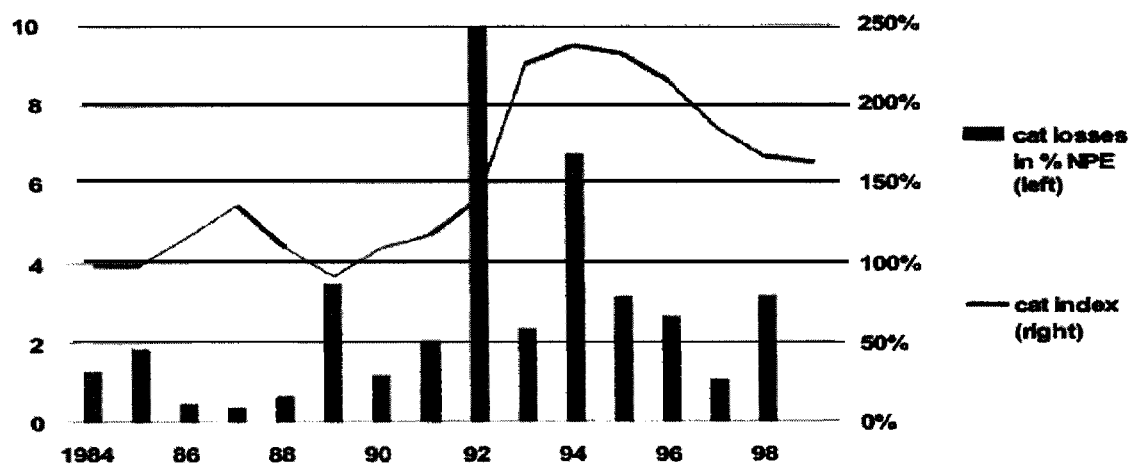
Figure 4:
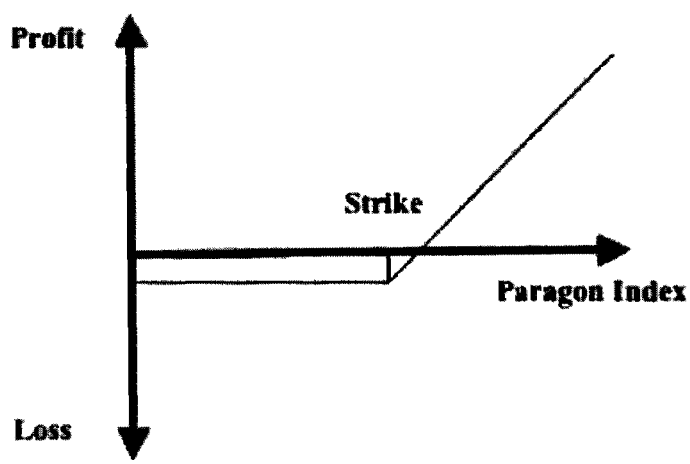
FIG. 4 illustrates what is known as Pay Off Structure for cash-value-based systems. The concept exhibits a series of Call Options for the Paragon Price Index, which secure against future rises in CatXL reinsurance premiums.

The operational stabilization apparatus 10 comprises a filter module 108. The filter module 108 is used by a pickup apparatus 109 to filter measurement data relating to maintenance parameters for the intervention apparatus 20 and to store them such that they can be attributed to the respective intervention apparatus 20. A variable, incrementable trigger stack is increased in weighted fashion by means of a weighting module on the basis of weighting parameters attributed to the intervention apparatus 20 and on the basis of the aforementioned measurement data. The stack height may be calibrated or weighted such that the trend in the stack height corresponds, by way of example, to a catastrophe bond (Cat Bond) price index, such as the Paragon Catastrophe Price Index issued every 6 months by E.W. Blanch. FIG. 3 illustrates a possible trend in the stack height plotted against the time axis x. In the prior art, it was inevitably recurrently found that the effective risk of operational stoppage as a result of natural catastrophes and the technical implementation of the comprehension of the risk, i.e. the exposure, do not in any way overlap as a result of intervention apparatuses for intercepting the malfunctions. This was made painfully obvious to industry by Cyclone Andrew and the earthquake in Northridge. The prior art's inability to counter such risks by technical means resulted in the interventions on the existing intervention apparatuses being excluded or limited from these exposures, to the extent that the laws actually allowed this. This resulted in explosively increased demand for technical alternatives. At the same time, the costs and premiums for the intervention apparatuses also rose. Even providing collection pools such as the Florida Hurricane Cat Fund or the Californian Earthquake Authority was not able to correct the materialized defects in the prior art effectively enough. Incorrect technical comprehension of the processes and of the risks as a result of such large-scale catastrophes is possible for all kinds of catastrophes, but the location and level of the risk always remain key parameters. Naturally, comprehension is likewise crucial in the prior art. Weather processes are understood far better than seismological processes, for example. This is also related to the fact that the technical effects of weather events can be observed by engineers and scientists much more frequently than the effects of earthquakes, for example. Events whose effects are not meaningfully picked up by the intervention apparatuses by technical means result in new dynamics for risk transfer. The influence of Hurricane Andrew (1992) and of the Northridge earthquake (1994) for intervention apparatuses and methods for intercepting the resultant malfunctions and damage is obvious to see in the abruptly changing ratio of ceded premiums (transferred and accepted) in the different liability and fixed-assets columns, which are ceded to a second stage, such as a reinsurer. In this case, the ceded premiums can be regarded as a measure of the uncertainty of the intervention apparatuses involved, although the involvement of a reinsurer, for example, makes neither an effective nor a technical contribution to solving the problem of the prior art. By contrast, the drawbacks of the prior art are system-inherent and are thus easily propagated in each further stage. The table below illustrates the alteration of this ratio on the basis of the two events in Hurricane Andrew (1992) and the Northridge earthquake (1994):

TABLE 1

From "Industry Schedule P for Property Lines of Business"
Ratio of reinsurance-ceded liability and fixed-assets columns in the prior art

| 1990 | 1991 | 1992 | 1993 | 1994 | 1995 | 1996 | 1997 | 1998 | 1999 |
|------|------|------|------|------|------|------|------|------|------|
| 17.3% | 17.2% | 17.6% | 18.6% | 20.7% | 21.5% | 19.9% | 19.1% | 18.0% | 19.6% |

Figure 5:
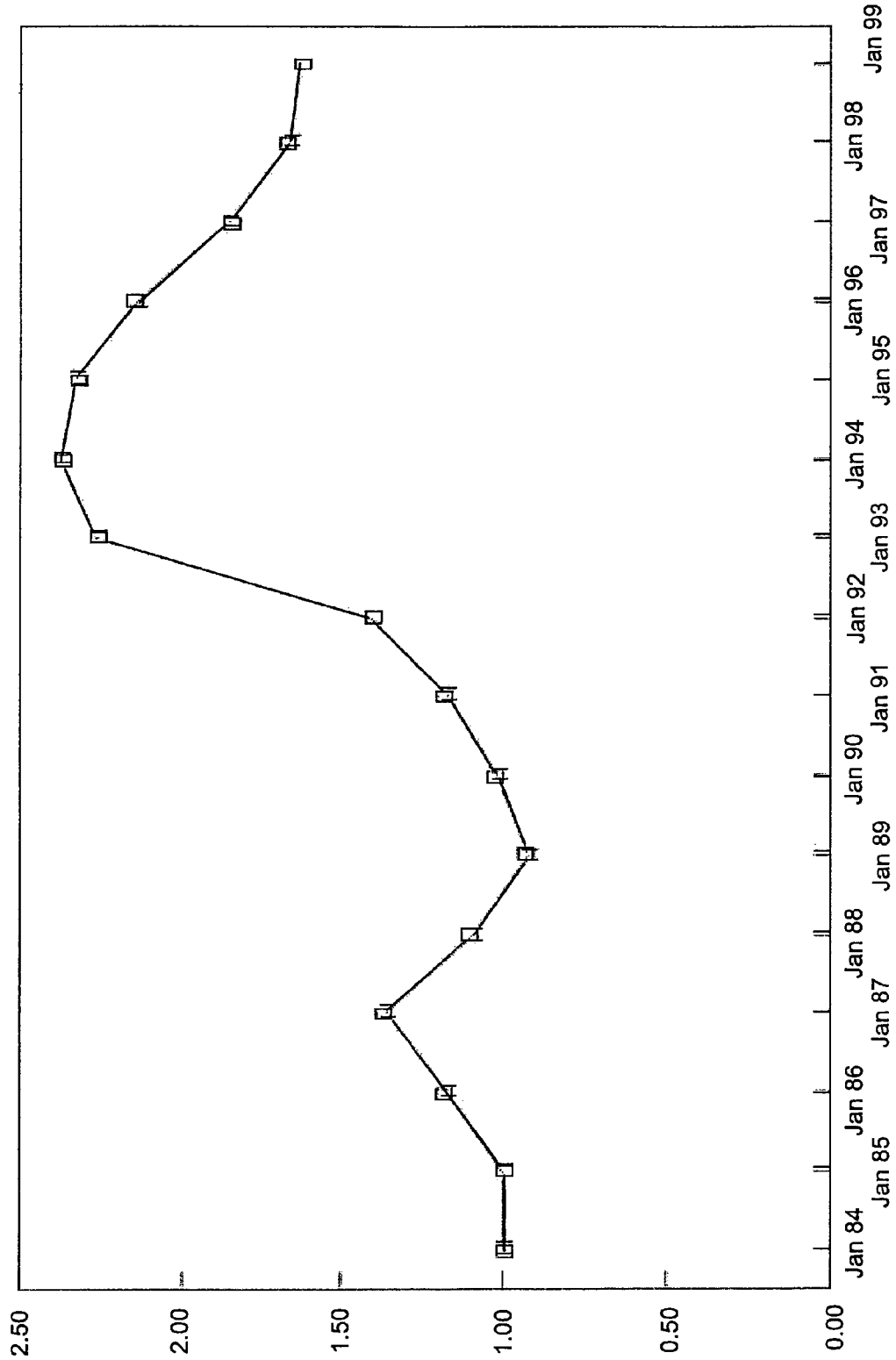
Figure 6:
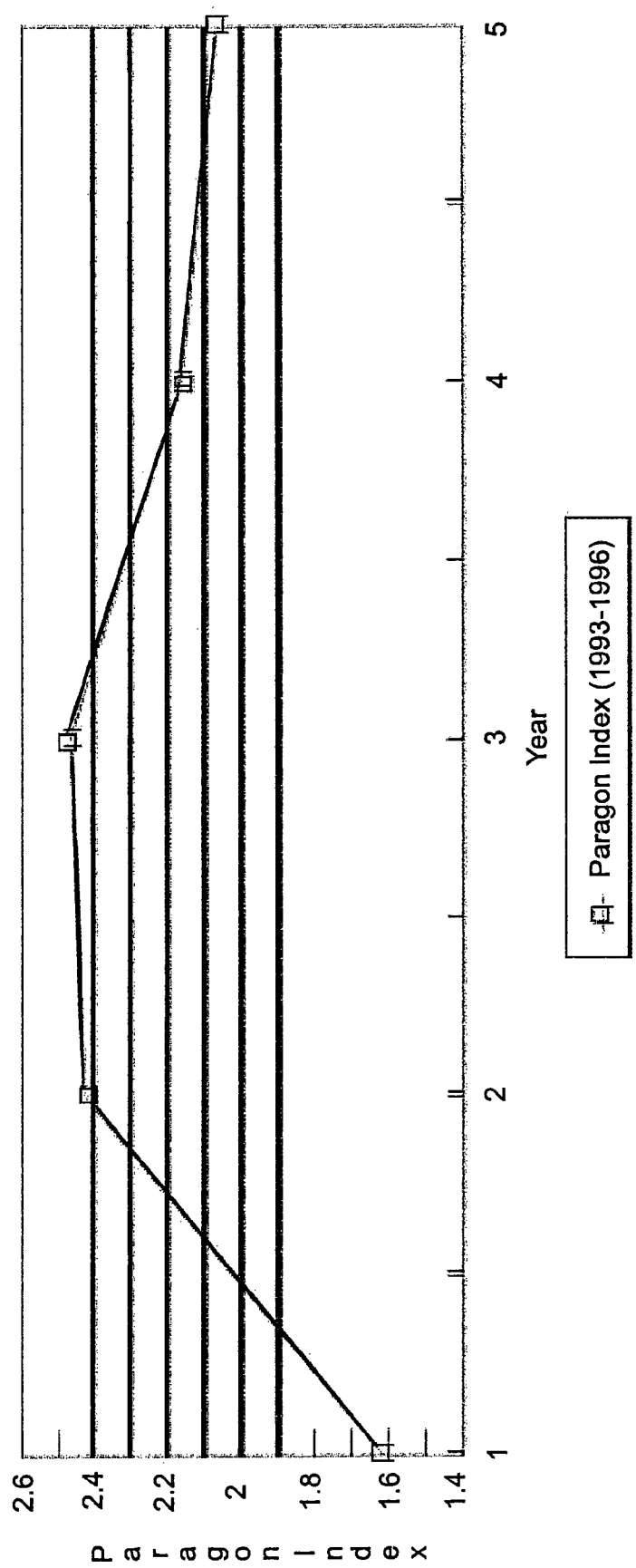
FIG. 6 shows another example of a scenario on the basis of the development in the Paragon Index similar to that between 1993 and 1996.

What can be seen even more dramatically is the impact of Hurricane Andrew on industry and market in the trend in what is known as the Paragon Index (actually: Paragon Catastrophe Price Index). As a result of Cyclone Andrew, the price for catastrophe reinsurances almost doubled, which resulted in an increase in the index from 1.4 to 2.4. FIG. 3 and FIG. 5 show the trend in the Paragon Index as an example of a catastrophe index for the years before and after Hurricane Andrew. If the stack height is calibrated in a ratio with the Paragon Index, the stack height is therefore, in other words, a relative measure of the accumulated prices for catastrophe risk cession on the domestic US market, known as Composite Domestic U.S. Property Catastrophe Prices. It compares the average market price at each due date with the average market prices in the previous year. The index is based on over 300 firms and over 100 CatXL Layers, corresponding to 45% of the industry. The Paragon Index is updated every 6 months. A standardized industry and/or fixed-assets distribution, which involves differences in the parameters per geographical area, size of firm, constraints, insurance excess and capital reserve, can be used to compare the prices for reinsurances on the basis of time. The stack height or the index then reflect the general market rates regardless of any shifts in the actual implemented reinsurances. The stack height or the index can be reweighted periodically or upon request in order to comply with alterations in the distribution on the market over a relatively long period of time. The Paragon Index as a catastrophe index, cited here by way of example for calibrating the stack height, is part of E.W. Blanch Holding Inc. as Paragon Reinsurance Risk Management Services Inc.

A trigger module 110 is used to activate the intervention apparatus 20 when a predefinable stack height for the trigger stack is detected on the basis of the second stack. This can be done, by way of example, by enabling arbitrary intervention means 40 or else performance parameters, particularly cash-value-based performance parameters. When a predefined timing threshold value is reached by means of the lookup table, the current stack height of the second stack is taken as a basis for transferring incrementation parameters (particularly also cash-value-based incrementation parameters in this case) to the user apparatuses 31, . . . , 34. As an exemplary embodiment, when the threshold value is reached (strike), for example, it is no longer possible to transfer any incrementation parameters at all to the user apparatuses 31, . . . , 34, whereas when the threshold value is not reached (trigger threshold value), all or almost all incrementation parameters are transferred to the network units or corresponding user apparatuses 31, . . . , 34. The predefinable stack height may be able to be determined by the user apparatuses 31, . . . , 34, for example. As operating parameters, for example, the user apparatuses 31, . . . , 34 can in this case determine the period of time, the stack height of the trigger stack as "Strike Level". In one specific variant embodiment as a cash-value-based intervention apparatus, particularly a multistage cash-value-based intervention apparatus with, by way of example, a fundamental or initial stage and a second stage as reserved stage, the parameters may also comprise the percentage of CatXL premiums which are meant to be protected, for example. In one exemplary embodiment, the parameters may be determined such that the cash-sum value of the firm to be protected (Subject Capital) is equal to the ratio between the Cat CL premium which is to be protected and the stack height or Paragon Index in year 1. This corresponds to a hypothetical CatXL premium for the Paragon Index equal to 1. The operational apparatus 31, . . . , 34 transfers a cash-sum-value premium to the intervention apparatus 80 periodically, e.g. annually. Each year, when the Paragon Index or the stack height is in excess as trigger level (Strike), the intervention apparatus 80 can, as one variant embodiment, take the second stack height as a basis for determining the quantity of incrementation parameters which are to be transferred to the operational apparatus 31, . . . , 34 as: (stack height (Paragon Index)—trigger threshold value (Strike))*Subject Capital. In an at least partially cash-value-based two-stage exemplary embodiment, the following may result, for example:

Table 2 illustrates another two-stage exemplary embodiment.

| | Year 1 | | Year 2 |
|---|---|---|---|
| CatXL premium | USD 15'00'000 | CatXL premium | USD 20'000'000 |
| Stack height (Paragon Index) | 1.50 | Stack height (Paragon Index) | 2.00 |
| CatXL premium to be protected | 100% | Transferred incrementation parameters from the second stack | USD 2'000'000 |
| >Subject Capital | USD 10'000'000 | >Protected CatXL premium | USD 18'000'000 |
| Trigger threshold value (Strike) | 1.80 | | |

Figure 7:
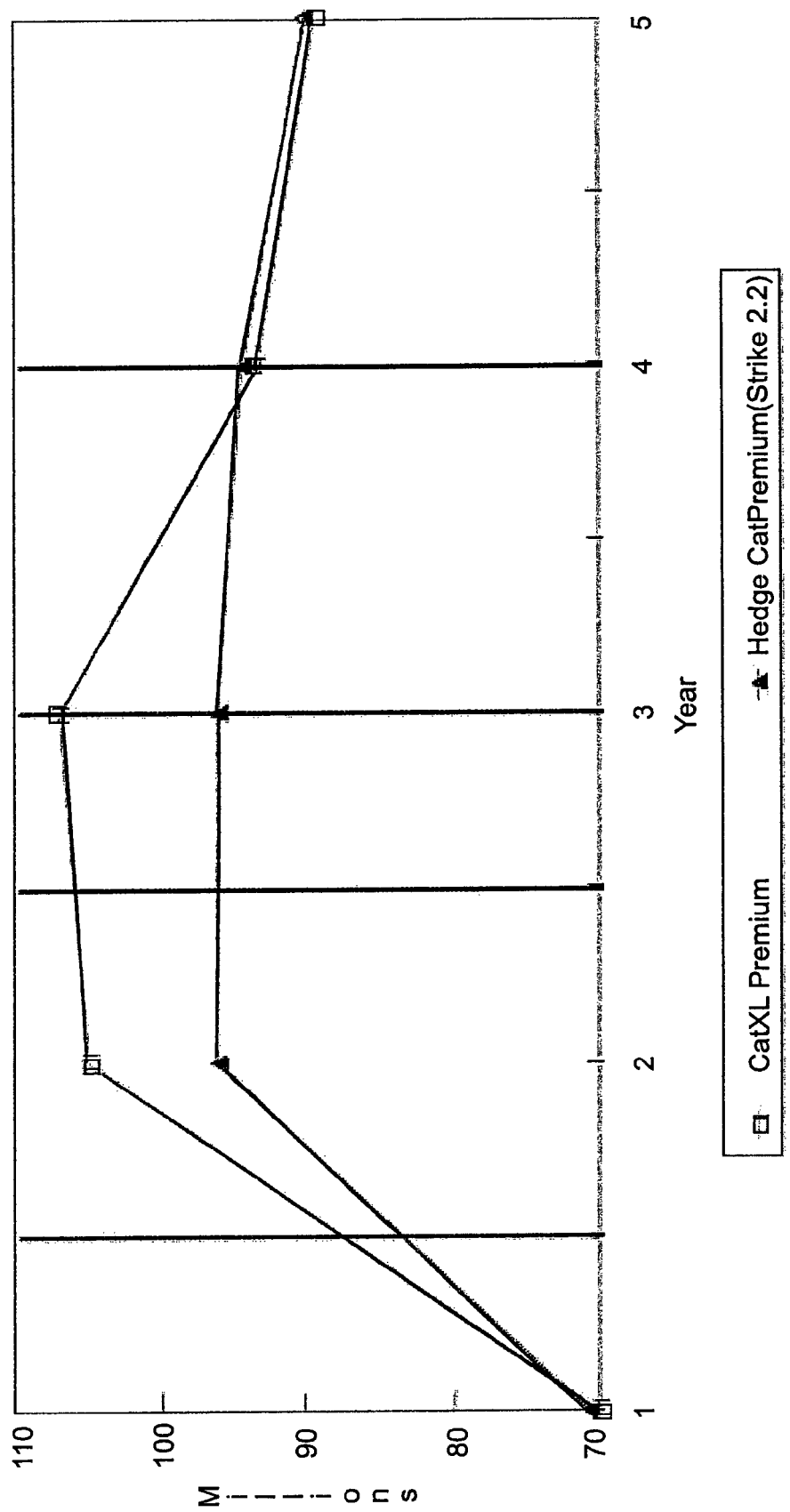
FIG. 7 illustrates the result of the use of a variant embodiment based on the invention for the incrementation parameters, first without the intervention apparatus 80 and then with the intervention apparatus 80.

For the method, this may result in the following for CatXL, for example: 1) USD 50,000,000 for USD 250,000,000; 2) USD 100,000,000 for USD 300,000,000; 3) USD 100,000,000 for USD 400,000,000; 4) USD 150,000,000 for USD 500,000,000; 5) USD 450,000,000 for USD 650,000,000; 6) USD 500,000,000 for USD 1,100,000,000. The CatXL premium supposedly gives USD 70,000,000 per annum, for example, and the stack height as Paragon Index gives 1.6515 in the first year. In another exemplary embodiment, the transfer between intervention apparatus 80 and the operational apparatus 31, ..., 34 may be limited to 5 years, for example. Similarly, the transfers during a first determinable period of time, for example one year, may be excluded, for example. As a further cash-value-based example, the trigger threshold value (Strike) may then be 2.2, for example. The cash-sum value or CatXL premium to be protected may be 100%, which may correspond to a Subject Capital of USD 43,343,653. The incrementation parameter periodically transferred from the operational apparatus 31, ..., 34 to the intervention apparatus 80 may then be USD 798,791 annually, for example. This corresponds to a CatXL premium to be protected, divided by the trigger threshold value (Paragon Index), of (USD 70,000,000/1.615=USD 43,343,653) in the first year. FIG. 7 illustrates the result of using an intervention apparatus based on the invention for the incrementation parameters using this exemplary embodiment, these corresponding to the Cat premiums in the case of this cash-value-based exemplary embodiment.

TABLE 3

| Year | Trigger threshold value (Paragon Index) | CatXL premium (USD) | Incrementation parameter (USD) | Index value ×s trigger threshold value (Strike) | Transfer to the reception apparatuses 31, ..., 34 (USD) | Protected CatXL premium (USD) |
|---|---|---|---|---|---|---|
| 1 | 1.615 | 70'000'000 | 798'791 | | | 70'798'791 |
| 2 | 2.42 | 104'891'641 | 798'791 | 0.22 | 9'535'604 | 96'154'828 |
| 3 | 2.47 | 107'058'824 | 798'791 | 0.27 | 11'702'786 | 96'154'828 |
| 4 | 2.16 | 93'622'291 | 798'791 | | | 94'421'082 |
| 5 | 2.06 | 89'287'926 | 798'791 | | | 90'086'717 |
| Total | | 464'860'681 | 3'993'995 | | 21'238'390 | 447'616'246 |

Table 3 and FIG. 7 illustrate the exemplary embodiment mentioned above.

Figure 8:
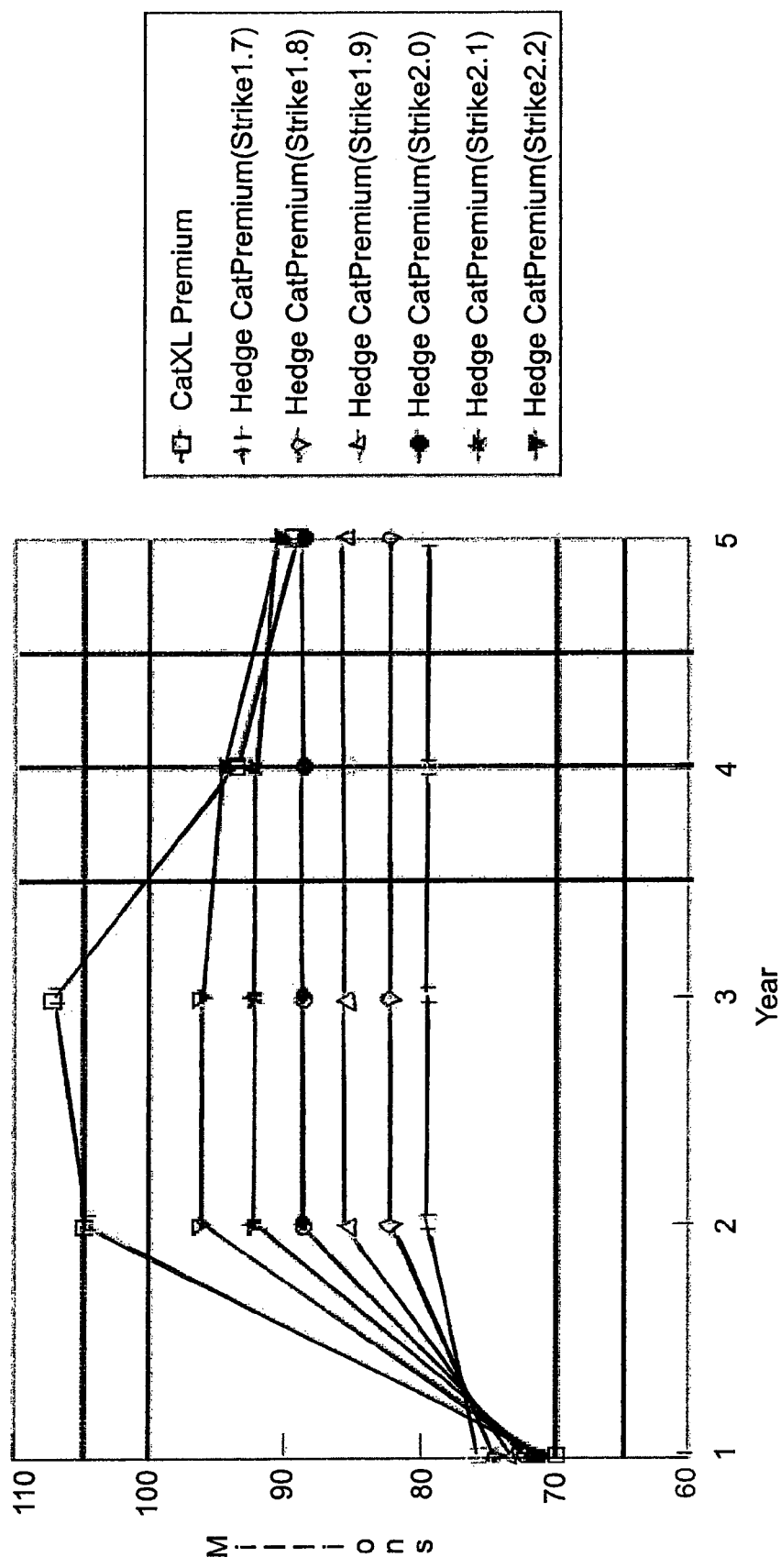
FIG. 8 illustrates the result of the intervention apparatus for the incrementation parameters for the same exemplary embodiment for differently selected trigger threshold values (strike).

When determining a profit threshold for a break even point for this exemplary embodiment, the following would be obtained (trigger threshold value (Strike)+stack heightyear1* (incrementation parameter/CatXL premiumyear1)=2.20+ 1.615*(798,791/70,000,000)=2.20+0.02=2.22. FIG. 8 illustrates the result of the intervention apparatus for the incrementation parameters for differently selected trigger threshold values (Strike). In the cash-value-based exemplary embodiment cited above, this corresponds to a protection premium for protecting a CatXL premium in line with the cited cash-sum value of USD 70,000,000. The values from the exemplary embodiment in FIG. 8 are as follows:

TABLE 4

USD 70'000'000 CatXL Premium to be protected for a trigger threshold value of 1.90 (cf. FIG. 8).

| Trigger threshold value (Strike) | Year | Transferred incrementation parameters (USD) |
|---|---|---|
| 1.90 | 2 | 1'400'000 |
| 1.90 | 3 | 2'200'000 |
| 1.90 | 4 | 2'800'000 |
| 1.90 | 5 | 3'200'000 |
| 1.90 | 6 | 3'400'000 |
| 1.90 | 7 | 3'600'000 |

TABLE 5

USD 70'000'000 CatXL premium to be protected for a trigger threshold value of 2.00 (cf. FIG. 8).

| Trigger threshold value (Strike) | Year | Transferred incrementation parameters (USD) |
|---|---|---|
| 2.00 | 2 | 1'000'000 |
| 2.00 | 3 | 1'500'000 |
| 2.00 | 4 | 1'800'000 |
| 2.00 | 5 | 2'000'000 |
| 2.00 | 6 | 2'200'000 |
| 2.00 | 7 | 2'300'000 |

TABLE 6

USD 70'000'000 CatXL Premium to be protected for a trigger threshold value of 2.10 (cf. FIG. 8).

| Trigger threshold value (Strike) | Year | Transferred incrementation parameters (USD) |
|---|---|---|
| 2.10 | 2 | 700'000 |
| 2.10 | 3 | 1'000'000 |
| 2.10 | 4 | 1'200'000 |
| 2.10 | 5 | 1'300'000 |
| 2.10 | 6 | 1'400'000 |
| 2.10 | 7 | 1'500'000 |

TABLE 7

USD 70'000'000 CatXL Premium to be protected for a trigger threshold value of 2.20 (cf. FIG. 8).

| Trigger threshold value (Strike) | Year | Transferred incrementation parameters (USD) |
|---|---|---|
| 2.20 | 2 | 400'000 |
| 2.20 | 3 | 600'000 |
| 2.20 | 4 | 730'000 |

TABLE 7-continued

USD 70'000'000 CatXL Premium to be protected
for a trigger threshold value of 2.20 (cf. FIG. 8).

| Trigger threshold value (Strike) | Year | Transferred incrementation parameters (USD) |
|---|---|---|
| 2.20 | 5 | 800'000 |
| 2.20 | 6 | 900'000 |
| 2.20 | 7 | 1'000'000 |

To activate the intervention means 40 when an intervention event is detected, the activation apparatus 203 accesses the first and/or second incremented stack 102/202, according to the threshold value being reached. The first and/or second stack is accordingly decremented, with a weighting module 901 being able to be used for quantitative control of the access and/or decrementation. By way of example, it may make sense to use a memory area which is separate from the incrementable stack 102 of the second protected memory module 101 to attribute protected portions of the incrementable stack 102 to the separate stack on the basis of the lookup table 103. It is therefore possible to guarantee a risk premium in the case of cash-sum-value-based apparatuses, for example. A counter module 104 is used to increase a storable counter periodically and/or upon request, with value parameters being attributed to the respective identification data on the basis of the first and second stacks 102/202 when a determinable threshold value for the counter is reached by means of the lookup table 103, and being transferred to at least one network unit 31, . . . , 34 by means of the intervention apparatus 80 via an interface module 30. The incrementation parameters can be transferred bidirectionally or unidirectionally in protected form by means of the interface module 30, for example, with the incrementation parameters being attributed to specific identification data by means of the lookup table 103. For the clock signal, an electrical clock signal at a reference frequency can be produced by means of an integrated oscillator in the counter module 104, for example, with the clock signal being taken as a basis for periodically increasing the counter. An apparatus based on the invention can therefore be used for levelling the protection premiums paid on the basis of time, for example. At the same time, fluctuations in the maintenance for the intervention apparatuses 80 and for the reception apparatuses 31, . . . , 34 can be effectively intercepted automatically. This can be done particularly without affecting the protection for malfunctions in the reception apparatuses 31, . . . , 34, the intervention means 40 and/or the operational apparatuses 41 connected to the intervention means 40 or the means and/or firms/installations 41 which are to be protected.

For the purpose of automated emergency intervention in the event of malfunctions in the one or more operational apparatuses 41, for example, the intervention apparatus 80 can be connected unidirectionally or bidirectionally to the one or more operational apparatuses 41 by means of a monitoring and/or alarm apparatus 402. This allows full automation of the monitoring, control and intervention. In addition, a position-finding module in the pickup apparatus 401 can be used to generate location coordinate parameters for the geographical location of the operational apparatus 41, and the monitoring and/or alarm apparatus 402 in the one or more operational apparatuses 41 can be used to transmit them to the intervention apparatus 80. By way of example, a control module can be used to allow the activation apparatus 203 to be enabled for activating the intervention means 40 only if pickup of the incrementation parameters is detected periodically and/or in concordance with definable monitoring parameters. The intervention means 40 can, as mentioned, be used to activate emergency apparatuses and/or cash-value-based transfer modules automatically on the basis of the detected intervention events. Automated emergency systems include, by way of example, automatically triggered deletion systems, power-stoppage or emergency generator systems, operational monitoring systems with automated control and/or alarm apparatuses, signal-conversion or relay systems for automated alarm or monitoring control triggering etc. etc.

The intervention apparatus 80 may be connected to one or more further intervention apparatuses 80 in synchronized fashion on the basis of a quote sharing parameter or hierarchic structures for the intervention risks and malfunction risks or operational stoppage risks, for example. This is known in the case of multistage intervention apparatuses, for example. Since relatively large fluctuations in the annularly cumulated operational stoppages and/or malfunctions (in the case of purely cash-value-based apparatuses, reference is also made to claims for damages) are normal for catastrophes, it is also possible for second stages of the intervention apparatuses, such as, in particular, automated reinsurance systems, [lacuna] intervention claims in line with a fixed proportion parameter synchronized between the systems beforehand. The automated intervention apparatus 80 may also comprise a prediction module or extrapolation module. The extrapolation module can be used, by way of example, to generate the operational interventions for future time intervals. In the case of cash-value-based apparatuses, this may also include collateralization level parameters and/or remuneration parameters for cumulable malfunction parameters or damage risks. Like the other units based on the invention, the extrapolation module can be implemented in hardware and/or software. In the case of the technical implementation of cash-value-based apparatuses, such collateralization level parameters with cash-sum values for cumulable malfunction risks or damage risks can be divided by means of a determinable user factor and a central unit factor. These collateralization level parameters are stored in association with accumulable malfunction risks in line with the determinable central unit factor. The intervention apparatus 80 can transfer the incrementation parameters (in the case of automated insurance systems and/or reinsurance systems, these may also be agreed premium parameters and/or corresponding cash-sum values) for the relevant collateralization level parameters for cumulable operational interventions or damage risks to the first protected memory module 201. In this variant embodiment, the network units 31 to 34 can transfer cash-sum values, for example, on the basis of the determinable user factor to the second memory module 101 and can store them in association with the cumulable malfunction risks or damage risks. The network units 31 to 34 can comprise technically individualizable user modules of quite general type, for example.

To implement the first and/or second adder module 106/205, it is possible, in the case of cash-value-based variant embodiments, for the stack heights to be transferred to a financial institute, for example, by means of the reading modules 105/204 (the stack height corresponding to the cash-sum values in this case, for example) in the first and/or second protected memory module 101/201 during the available time. The monitoring and/or control may be effected in automated fashion, for example, by means of the timer units 107/206. In this exemplary embodiment, the financial institute may cover a bank and/or stock-market center and/or an investor, for example. After a determinable time interval, remuneration parameters, such as interest and/or other returns from the invested cash-sum values, are transferred, in line with the transmitted cash-sum values, as incrementation parameters from the financial institute to the first and/or second protected memory unit 101/201 and are automatically added to the already stored parameters and stored by the intervention apparatus 80, i.e. the first and/or second stack 102/202 is/are accordingly incremented. The intervention apparatus 80 can, for example when intervention events have arisen in the time interval, transmit first charging data with charging parameters for crediting cash-sum values to a clearing module in association with an operational apparatus 41. The transmitted incrementation parameters or cash-sum values are decremented from the first protected memory module 201 or the stored incrementation parameters in the first memory module 201 and, if the first memory module 201 does not comprise an appropriate stack height (in this case further cash-sum values, for example) for the first incrementable stack 202, are decremented from the second protected memory module 101. Second charging data with charging parameters for crediting cash-sum values can be transmitted to a clearing module in association with a network unit 31 to 34 on the basis of a predeterminable risk remuneration factor. If the second memory module 102 comprises a positive stack height signal by means of the reading module 204 (in this case positive cash-sum values, for example) when the time interval has elapsed, e.g. on the basis of the timer unit 206, third incrementation parameters with charging parameters for crediting cash-sum values are transmitted to a clearing module in association with the network unit 31 to 34 on the basis of the cash-sum values in the second memory module 101 and the risk remuneration factor. Charging parameters and/or collateralization levels and/or malfunction events can be generated as appropriate charging data and/or parameters, for example, both by the intervention apparatus 80 or individual apparatus components or else by a financial institute or even by means belonging to a user, for example. The charging data and/or remuneration parameters may comprise charging records (e.g. electronically signed), for example, similar to CDRs (Call Data Records) in the case of what are known as DURs (DAB/DVB Usage Records).

By way of example, the charging records are transmitted to a clearing module. The clearing module may also be associated locally with third parties such as a credit card company. The charging data are processed further by means of the clearing module, or said systems (intervention apparatus 80, user means etc.) to form the charging independently. A repackaging module can be used to provide performance-oriented and/or clearing-module-specific incrementation parameters or charging data, for example, with an electronic stamp, and an electronic signature or an electronic watermark in optimized fashion too. The electronic signature allows the charging data to be attributed to the relevant system and/or apparatus at an arbitrary later time. In one specific variant embodiment, it may make sense for the network units 31 to 34 to be attributed submodules with different risk classes for malfunctions in the operational apparatuses 41 and with different risk remuneration factors and/or, by way of example, different transmission condition parameters for transmitting cash-sum values from the second protected memory module 201.

To achieve additional automation for the technical implementation, which, in particular, also makes dynamic customization of the inventive intervention apparatus 80 possible, the first and/or second protected memory module 101/201 may comprise a monitoring module, for example. The monitoring module acts as a trigger apparatus and may be implemented in hardware and/or software. The monitoring module can be used, by way of example, to compare a risk remuneration factor with a remuneration parameter on the basis of the cumulated incrementation parameters (in the case of cash-value-based apparatuses, this may correspond to cash-sum values) of the second protected memory module 101 and, if the risk remuneration factor is detected at a definable threshold value below the remuneration parameters, to activate intervention means in a second stage. To provide a feedback and/or monitoring option for a user, the weighting module 901 can be used, for example, to determine at least one variable weighting parameter on the basis of the detected first and/or second stack height signals and collateralization level parameters and the maximum possible intervention disturbances. The weighting parameter can be customized for one of the rating methods known generally in the prior art for rating people, articles or companies and/or can be normalized to such a method. Since the users come from the capital market end, it may be important, by way of example, to use a rating method known in the banking sector for the normalization. To rate a debtor's ability to pay, rating codes are used. The classification can be determined using dedicated criteria from the bank, or from internationally operating rating agencies, such as Moody's, Standard & Poor's or Fitch. By way of example, the known AAA may represent a high credit rating, and C or even D may represent a very poor one. The individual category names may differ from agency to agency. Thus, by way of example, Moody's uses numbers as a supplement, e.g. A1, A2, A3; while Standard & Poor's add the "+" and "−" symbols, e.g. B+, B, B−. The intervention apparatus can perform user-specific normalization dynamically on the basis of a user profile for a user, for example. Ratings can be given both for companies and for countries. Thus, by way of example, Austria has an AAA rating. In addition, a company can normally never achieve a better rating than the country in which it is domiciled. In the prior art, it is usually the case that a debtor with a better rating can obtain capital under better conditions. On the other hand, it is possible to achieve a higher return from debtors with a poor rating, but the likelihood of payment default (credit rating risk) is much higher. It is therefore important to mention that downgrading the rating frequently has a catastrophic effect on companies and countries which suddenly have to provide more return for their capital requirements. In addition, there were therefore also frequently major disputes between the rating agency and the assessed systems and/or companies regarding the rating. This naturally also applies to the exemplary embodiment of the intervention apparatus 80 which is discussed here. For a good rating, the cumulated cash-sum values in the first protected memory module 201 and in the second protected memory module 101 and also the incremention parameters for the first incrementatable stack 202 may be relevant, for example. To be as attractive as possible to any users of the network units 31 to 34 (e.g. meaning an investor), it is possible to customize the stack height or the incrementation parameter for the second protected memory module 101, for example. This can also be done dynamically. At the same time, in the case of cash-value-based apparatuses, it is also possible, by way of example, to reduce the inherent transferred incrementation parameters (e.g. means tied as a collateralization level, such as stored cash-sum values) by means of the intervention apparatus 80, or by customizing the stack height or the incrementation parameters of the second protected memory module 101 and to enable them for other functions. This has not been possible in this manner in the prior art to date. Part of this is the fact that intervention means 40 which are newly available with the intervention apparatus 80 are compared, as mentioned, with remuneration parameters, e.g. by capital markets, and can be customized as appropriate. In addition, it is worth pointing out that although the costs of the rating must normally be borne by the company to be assessed in the case of cash-value-based apparatuses, it is usually better to have a poor rating than none at all, since many investors associated with the possible network units 31 to 34 ignore debtors without a rating. Particularly in the USA, there is already a long tradition of rating and it is next to impossible to receive capital without a rating. For this reason, most well-known European companies are now also covered by rating.

An interface on the weighting module can be used by the user to transmit the at least one variable weighting parameter, for example, to mobile and/or fixed network units or nodes 31 to 34 via a network 50/51. The user therefore has dynamic control over the network units 31 to 34 available to him. It is even conceivable that he can customize his association with one or more submodules 31/32/33/34 dynamically on the basis of the weighting parameter. By way of example, the communication networks 50/51 comprise a GSM network or a UMTS network, or a satellite-based mobile radio network and/or one or more landline networks, for example the public switched telephone network, the worldwide internet or a suitable LAN (Local Area Network) or WAN (Wide Area Network). In particular, it also comprises ISDN and XDSL connections.

The invention claimed is:

1. A fully automated, computer-aided intervention system for preventing malfunctions and/or operating stoppages in operational apparatuses, the intervention apparatus comprising:
   an intervention unit with a first protected memory module and a first incrementable stack, the intervention unit periodically picking up incrementation parameters, the incrementation parameters being attributed to one or more operational apparatuses;
   an activation apparatus that activates an appropriate intervention unit on the basis of the first incrementable stack when an intervention event detected by at least one pickup unit occurs;
   an operational stabilization apparatus with a second protected memory module;
   a second incrementable stack and a lookup table the second incrementable stack being incremented via second incrementation parameters, the second incrementation parameters being attributed to identification data from network units via the lookup table,
   wherein the operational stabilization apparatus includes a filter module, the filter module being used by a pickup apparatus to filter measurement data relating to maintenance parameters for the intervention unit and to store the filtered measurement data such that the filtered measurement data is attributed to the respective intervention unit, with a variable trigger stack that is increased in weighted fashion via a weighting module on the basis of weighting parameters attributed to the intervention unit and on the basis of the filtered measurement data; and
   a trigger module, where the intervention unit can be activated upon detection of a predefinable stack height for the variable trigger stack on the basis of the second incrementable stack, and incrementation parameters can be transferred to the network units when a predefined timing threshold value is reached via the lookup table on the basis of the current stack height of the second incrementable stack,
   wherein the first and second protected memory modules include a monitoring module which is implemented as hardware or as a hardware/software combination.

2. The intervention apparatus as claimed in claim 1, wherein the measurement parameters include the number of interventions via alarm and/or monitoring and/or intervention systems.

3. The intervention apparatus as claimed in claim 1, wherein the intervention unit includes a first reading module that generates a first stack height signal in line with the current stack height of the first incrementable stack, with the first stack height signal being taken as a basis for additionally incrementing the first incrementable stack via a first adder module.

4. The intervention apparatus as claimed in claim 3, wherein the first reading module generates the first stack height signal in real time.

5. The intervention apparatus as claimed in claim 3, further comprising:
   a timer unit,
   wherein the first stack height signal is produced periodically within a definable time window.

6. The intervention apparatus as claimed in claim 1, wherein an interface module for the network units provides for protected bidirectional or unidirectional transfer of incrementation parameters, with the incrementation parameters being attributed to specific identification data via the lookup table.

7. The intervention apparatus as claimed in claim 1, wherein the intervention apparatus includes a second reading module that generates a second stack height signal in line with the current stack height of the second incrementable stack, with the second stack height signal being taken as a basis for additionally incrementing the second incrementable stack via a second adder module.

8. The intervention apparatus as claimed in claim 7, wherein the second reading module generates the second stack height signal in real time.

9. The intervention apparatus as claimed in claim 7, wherein the intervention apparatus includes a timer unit, with the second stack height signal being produced periodically within a definable time window.

10. The intervention apparatus as claimed in claim 1, further comprising:
    a network interface, with at least one decentralized database with attributed stock-market or financial-institute parameters being accessed via the network interface.

11. The intervention apparatus as claimed in claim 1, wherein the second protected memory module includes a memory area which is separate from the second incrementable stack, with protected portions of the second incrementable stack being attributed to the separate stack via the lookup table.

12. The intervention apparatus as claimed in claim 1, wherein a counter module includes an integrated oscillator such that it is possible to produce an electrical clock signal at a reference frequency, with the clock signal being taken as a basis for periodically increasing the counter.

13. The intervention apparatus as claimed in claim 1, wherein the intervention apparatus is connected unidirectionally or bidirectionally to the one or more operational apparatuses via a monitoring and/or alarm apparatus for the purpose of automated emergency intervention in the event of malfunctions in the one or more operational apparatuses.

14. The intervention apparatus as claimed in claim 1, wherein the activation apparatus includes a control module such that the activation apparatus is enabled only when pickup of the incrementation parameters is detected periodically, for the purpose of activating the intervention unit.

15. The intervention apparatus as claimed in claim 1, wherein the intervention unit includes automated emergency apparatuses and/or cash-value-based transfer modules.

16. The intervention apparatus as claimed in claim 1, wherein the pickup apparatus is connected bidirectionally to at least one database of financial institutes, which is arranged in decentralized fashion via a network and a network interface.

17. The intervention apparatus as claimed in claim 1, wherein the variable trigger stack corresponds to an averaged US CatXL level parameter.

18. The intervention apparatus as claimed in claim 17, wherein the averaged US CatXL level parameter includes an averaged Composite Domestic US CatXL Price Level.

19. A fully automated, computer-aided intervention method, implemented by an intervention apparatus, for preventing malfunctions and/or operating stoppages in operational apparatuses, comprising:
periodically picking up incrementation parameters via a first intervention unit with a first protected memory module and a first incrementable stack, the incrementation parameters being attributed to one or more operational apparatuses;
activating an appropriate intervention unit via an activation apparatus on the basis of the first incrementable stack when an intervention event detected via at least one pickup apparatus is picked up;
wherein the intervention apparatus includes an operational stabilization apparatus with a second protected memory module, a second incrementable stack and a lookup table;
incrementing the second stack of the operational stabilization apparatus via second incrementation parameters, the second incrementation parameters being attributed to identification data from network units via the lookup table;
filtering measurement data relating to maintenance parameters for the intervention unit via a filter module of the operational stabilization apparatus by using a pickup apparatus;
storing the filtered measurement data such that the filtered measurement data is attributed to the respective intervention unit, with a variable trigger stack being increased step by step in weighted fashion via a weighting module on the basis of weighting parameters attributed to the intervention unit and on the basis of the aforementioned filtered measurement data;
activating the intervention unit upon detection via a trigger module of a predefinable stack height for the trigger stack on the basis of the second stack; and
transferring incrementation parameters to user apparatuses when a predefined timing threshold value is reached via the lookup table on the basis of the current stack height of the second stack,
wherein the first and second protected memory modules include a monitoring module which is implemented as hardware or as a hardware/software combination.

20. The intervention method as claimed in claim 19, wherein the measurement parameters include the number of interventions via alarm and/or monitoring and/or intervention systems.

21. The intervention method as claimed in claim 19, further comprising:
generating a first stack height signal in line with the current stack height of the first incrementable stack via a first reading module, with the first stack height signal being taken as a basis for additionally incrementing the first incrementable stack via a first adder module.

22. The intervention method as claimed in claim 21, wherein the first stack height signal is generated in real time via the first reading module.

23. The intervention method as claimed in claim 21, further comprising:
periodically producing the first stack height signal within a definable time window via a timer unit.

24. The intervention method as claimed in claim 19, wherein the incrementation parameters are transferred bidirectionally or unidirectionally in protected form via an interface module, with the incrementation parameters being attributed to specific identification data via the lookup table.

25. The intervention method as claimed in claim 19, further comprising:
generating a second stack height signal in line with the current stack height of the second incrementable stack via a second reading module, with the second stack height signal being taken as a basis for additionally incrementing the second incrementable stack via a second adder module.

26. The intervention method as claimed in claim 25, wherein the second stack height signal is generated in real time via the second reading module.

27. The intervention method as claimed in claim 25, further comprising:
periodically producing the second stack height signal within a definable time window via a timer unit.

28. The intervention method as claimed in claim 19, further comprising:
accessing at least one decentralized database with attributed stock-market or financial-institute parameters via a network interface.

29. The intervention method as claimed in claim 19, wherein a memory area which is separate from the second incrementable stack of the second protected memory module is used to attribute protected portions of the second incrementable stack to the separate stack on the basis of the lookup table.

30. The intervention method as claimed in claim 19, wherein an integrated oscillator in a counter module is used to produce an electrical clock signal at a reference frequency, with the clock signal being taken as a basis for periodically increasing the counter.

31. The intervention method as claimed in claim 19, wherein the intervention apparatus is connected unidirectionally or bidirectionally to the one or more operational apparatuses via a monitoring and/or alarm apparatus for the purpose of automated emergency intervention in the event of malfunctions in the one or more operational apparatuses.

32. The intervention method as claimed in claim 19, wherein a control module is used to enable the activation apparatus for activating the intervention unit only when pickup of the incrementation parameters is detected periodically and/or in concordance with definable monitoring parameters.

33. The intervention method as claimed in claim 19, wherein automated emergency apparatuses and/or cash-value-based transfer modules are activated via the intervention unit on the basis of the detected intervention events.

34. The intervention apparatus as claimed in claim 19, wherein the variable trigger stack corresponds to an averaged US CatXL level parameter.

35. The intervention apparatus as claimed in claim 34, wherein the averaged US CatXL level parameter includes an averaged Composite Domestic US CatXL Price Level.

36. A non-transitory computer-readable medium storing computer readable instructions thereon for preventing malfunctions and/or operating stoppages in operational apparatuses that when executed by a computer cause the computer to perform a method comprising:

- periodically picking up incrementation parameters via a first intervention unit with a first protected memory module and a first incrementable stack, the incrementation parameters being attributed to one or more operational apparatuses;
- activating an appropriate intervention unit via an activation apparatus on the basis of the first incrementable stack when an intervention event detected via at least one pickup apparatus is picked up;
- wherein the intervention unit includes an operational stabilization apparatus with a second protected memory module, a second incrementable stack and a lookup table;
- incrementing the second stack of the operational stabilization apparatus via second incrementation parameters, the second incrementation parameters being attributed to identification data from network units via the lookup table;
- filtering measurement data relating to maintenance parameters for the intervention unit via a filter module of the operational stabilization apparatus by using a pickup apparatus;
- storing the filtered measurement data such that the filtered measurement data is attributed to the respective intervention unit, with a variable trigger stack being increased step by step in weighted fashion via a weighting module on the basis of weighting parameters attributed to the intervention unit and on the basis of the aforementioned filtered measurement data;
- activating the intervention unit upon detection via a trigger module of a predefinable stack height for the trigger stack on the basis of the second stack; and
- transferring incrementation parameters to user apparatuses when a predefined timing threshold value is reached via the lookup table on the basis of the current stack height of the second stack.

* * * * *